(12) United States Patent
Weir et al.

(10) Patent No.: US 7,914,755 B2
(45) Date of Patent: *Mar. 29, 2011

(54) METHOD OF PREPARING CERAMIC POWDERS USING CHELATE PRECURSORS

(75) Inventors: Richard D. Weir, Cedar Park, TX (US); Carl W. Nelson, Austin, TX (US)

(73) Assignee: EEStor, Inc., Cedar Park, TX (US)

( * ) Notice: Subject to any disclaimer, the term of this patent is extended or adjusted under 35 U.S.C. 154(b) by 652 days.

This patent is subject to a terminal disclaimer.

(21) Appl. No.: 11/369,255

(22) Filed: Mar. 7, 2006

(65) Prior Publication Data

US 2007/0148065 A1   Jun. 28, 2007

Related U.S. Application Data

(63) Continuation-in-part of application No. 09/833,609, filed on Apr. 12, 2001, now Pat. No. 7,033,406.

(51) Int. Cl.
   *C22B 3/00*  (2006.01)

(52) U.S. Cl. ........... 423/1; 423/71; 423/263; 423/598; 423/599; 423/352; 423/356; 423/592.1; 423/594.16; 423/608; 501/134; 501/102; 501/105; 501/135; 501/136; 501/137

(58) Field of Classification Search ............... 423/352, 423/592.1, 598, 599, 594.16, 608, 356, 263, 423/1, 71; 501/134, 135, 136, 137, 102, 501/105; *C22B 31/00*
See application file for complete search history.

(56) References Cited

U.S. PATENT DOCUMENTS

| | | | |
|---|---|---|---|
| 3,647,364 A | | 3/1972 | Mazdiyasni et al. |
| 3,947,553 A | | 3/1976 | Moss |
| 4,054,598 A | | 10/1977 | eBlum et al. |
| 4,606,906 A | | 8/1986 | Ritter et al. |
| 4,643,984 A | | 2/1987 | Abe et al. |
| 4,671,618 A | | 6/1987 | Wu et al. |
| 4,733,328 A | | 3/1988 | Blazej |
| 4,772,576 A | * | 9/1988 | Kimura et al. .......... 501/105 |
| 4,834,952 A | | 5/1989 | Rollat |
| 4,839,339 A | * | 6/1989 | Bunker et al. .......... 505/510 |
| 4,859,448 A | | 8/1989 | Klee et al. |
| 4,880,758 A | | 11/1989 | Heistand, II et al. |
| 4,886,654 A | | 12/1989 | Ohga et al. |
| 4,946,810 A | | 8/1990 | Heistand, II et al. |

(Continued)

FOREIGN PATENT DOCUMENTS

EP   0250085 A2   12/1987

(Continued)

OTHER PUBLICATIONS

Carter, C. Barry et al., "Ceramic Materials Science and Engineering", 2007, Springer Science+Business Media, LLC; 4 pages.

(Continued)

*Primary Examiner* — Melvin C Mayes
*Assistant Examiner* — Jun Li

(57) ABSTRACT

Wet-chemical methods involving the use of water-soluble hydrolytically stable metal-ion chelate precursors and the use of a nonmetal-ion-containing strong base can be used in a coprecipitation procedure for the preparation of ceramic powders. Examples of the precipitants used include tetraalkylammonium hydroxides. A composition-modified barium titanate is one of the ceramic powders that can be produced. Certain metal-ion chelates can be prepared from 2-hydroxypropanoic acid and ammonium hydroxide.

28 Claims, 1 Drawing Sheet

U.S. PATENT DOCUMENTS

| | | | |
|---|---|---|---|
| 5,011,804 A * | 4/1991 | Bergna et al. | 501/138 |
| 5,017,446 A | 5/1991 | Reichman et al. | |
| 5,043,843 A | 8/1991 | Kimura et al. | |
| 5,045,170 A | 9/1991 | Bullock et al. | |
| 5,064,783 A | 11/1991 | Luckevich | |
| 5,082,811 A * | 1/1992 | Bruno | 501/134 |
| 5,086,021 A | 2/1992 | Sasaki et al. | |
| 5,087,437 A | 2/1992 | Bruno et al. | |
| 5,116,560 A | 5/1992 | Dole et al. | |
| 5,116,790 A * | 5/1992 | Bruno et al. | 501/139 |
| 5,118,528 A | 6/1992 | Fessi et al. | |
| 5,155,072 A | 10/1992 | Bruno et al. | |
| 5,196,388 A | 3/1993 | Shyu | |
| 5,238,673 A | 8/1993 | Bruno et al. | |
| 5,242,674 A | 9/1993 | Bruno et al. | |
| 5,252,311 A | 10/1993 | Riman et al. | |
| 5,340,510 A | 8/1994 | Bowen | |
| 5,362,472 A | 11/1994 | Lauter et al. | |
| 5,407,618 A * | 4/1995 | Stephenson | 264/623 |
| 5,417,956 A | 5/1995 | Moser | 423/592 |
| 5,445,806 A | 8/1995 | Kinugasa et al. | |
| 5,466,646 A | 11/1995 | Moser | |
| 5,514,822 A | 5/1996 | Scott et al. | |
| 5,559,260 A | 9/1996 | Scott et al. | |
| 5,654,456 A | 8/1997 | Scott et al. | |
| 5,708,302 A | 1/1998 | Azuma et al. | |
| 5,711,988 A | 1/1998 | Tsai et al. | |
| 5,730,874 A | 3/1998 | Wai et al. | 210/638 |
| 5,731,948 A | 3/1998 | Yializis et al. | |
| 5,738,919 A | 4/1998 | Thomas et al. | |
| 5,744,258 A | 4/1998 | Bai et al. | |
| 5,776,239 A | 7/1998 | Bruno | |
| 5,777,038 A | 7/1998 | Nishikawa et al. | |
| 5,797,971 A | 8/1998 | Zheng et al. | |
| 5,800,857 A | 9/1998 | Ahmad et al. | |
| 5,833,905 A | 11/1998 | Miki | |
| 5,850,113 A | 12/1998 | Weimer et al. | |
| 5,867,363 A | 2/1999 | Tsai et al. | |
| 5,900,223 A * | 5/1999 | Matijevic et al. | 423/263 |
| 5,929,259 A * | 7/1999 | Lockemeyer | 549/534 |
| 5,973,175 A * | 10/1999 | Bruno | 556/56 |
| 5,973,913 A | 10/1999 | McEwen et al. | |
| 5,995,359 A | 11/1999 | Klee et al. | |
| 6,005,764 A | 12/1999 | Anderson et al. | |
| 6,072,688 A | 6/2000 | Hennings et al. | 361/311 |
| 6,078,494 A | 6/2000 | Hansen | 361/321.5 |
| 6,159,442 A | 12/2000 | Thumm et al. | |
| 6,195,249 B1 | 2/2001 | Honda et al. | |
| 6,221,332 B1 | 4/2001 | Thumm et al. | |
| 6,228,161 B1 * | 5/2001 | Drummond | 106/464 |
| 6,243,254 B1 | 6/2001 | Wada et al. | |
| 6,268,054 B1 * | 7/2001 | Costantino et al. | 428/403 |
| 6,282,079 B1 | 8/2001 | Nagakari et al. | |
| 6,294,620 B1 | 9/2001 | Huang et al. | |
| 6,296,716 B1 * | 10/2001 | Haerle et al. | 134/7 |
| 6,331,929 B1 | 12/2001 | Masuda | |
| 6,352,681 B1 | 3/2002 | Horikawa et al. | 423/598 |
| 6,410,157 B1 | 6/2002 | Nakamura | |
| 6,420,476 B1 | 7/2002 | Yamada et al. | |
| 6,432,526 B1 | 8/2002 | Arney et al. | |
| 6,447,910 B1 | 9/2002 | Wataya | 428/403 |
| 6,485,591 B1 | 11/2002 | Nakao | |
| 6,501,639 B2 | 12/2002 | Takafuji | |
| 6,550,117 B1 | 4/2003 | Tokuoka | |
| 6,589,501 B2 | 7/2003 | Moser et al. | |
| 6,599,463 B2 | 7/2003 | Miyazaki et al. | |
| 6,627,099 B2 | 9/2003 | Ono et al. | |
| 6,673,274 B2 | 1/2004 | Venigalla et al. | 252/570 |
| 6,692,721 B2 | 2/2004 | Hur et al. | 423/598 |
| 6,703,719 B1 | 3/2004 | McConnell | |
| 6,715,197 B2 | 4/2004 | Okuyama | |
| 6,749,898 B2 | 6/2004 | Nakamura | |
| 6,790,875 B2 | 9/2004 | Noguchi et al. | |
| 6,790,907 B2 | 9/2004 | Takata et al. | |
| 6,819,540 B2 | 11/2004 | Allen et al. | |
| 6,869,586 B1 | 3/2005 | Moser et al. | |
| 6,905,989 B2 | 6/2005 | Ellis et al. | |
| 7,033,406 B2 | 4/2006 | Weir et al. | |
| 7,061,139 B2 | 6/2006 | Young | |
| 7,068,898 B2 | 6/2006 | Buretea et al. | |
| 7,091,344 B2 | 8/2006 | Hall et al. | |
| 7,147,834 B2 | 12/2006 | Wong et al. | |
| 7,164,197 B2 | 1/2007 | Mao et al. | |
| 7,182,930 B2 | 2/2007 | Tsay et al. | |
| 7,190,016 B2 | 3/2007 | Cahalen et al. | |
| 7,223,378 B2 | 5/2007 | Sterzel | |
| 7,228,050 B1 | 6/2007 | Buretea et al. | |
| 7,247,590 B2 | 7/2007 | Kawabata et al. | |
| 7,431,911 B2 | 10/2008 | Shirakawa et al. | |
| 7,496,318 B2 | 2/2009 | Miura et al. | |
| 7,595,109 B2 | 9/2009 | Weir et al. | |
| 2001/0010367 A1 | 8/2001 | Burnell-Jones | |
| 2002/0186522 A1 | 12/2002 | Honda et al. | |
| 2003/0052658 A1 | 3/2003 | Baretich | |
| 2003/0215384 A1 | 11/2003 | Sterzel et al. | |
| 2004/0071944 A1 | 4/2004 | Weir et al. | |
| 2004/0135436 A1 | 7/2004 | Gilbreth | |
| 2004/0163570 A1 | 8/2004 | Vanmaele et al. | |
| 2004/0175585 A1 | 9/2004 | Zou et al. | |
| 2005/0167404 A1 | 8/2005 | Yamazaki | |
| 2006/0022304 A1 | 2/2006 | Rzeznik | |
| 2006/0078492 A1 | 4/2006 | Kurozumi et al. | |
| 2006/0133988 A1 | 6/2006 | Kurozumi et al. | |
| 2006/0159850 A1 | 7/2006 | Breton et al. | |
| 2006/0172880 A1 | 8/2006 | Shirakawa et al. | |
| 2006/0182667 A1 | 8/2006 | Zech et al. | |
| 2006/0210779 A1 | 9/2006 | Weir et al. | |
| 2006/0269762 A1 | 11/2006 | Pulugurtha et al. | |
| 2006/0283354 A1 | 12/2006 | Shinoda et al. | |
| 2007/0026580 A1 | 2/2007 | Fujii | |
| 2007/0040204 A1 | 2/2007 | Pulugurtha et al. | |
| 2007/0085212 A1 | 4/2007 | Mao et al. | |
| 2007/0141747 A1 | 6/2007 | Li et al. | |
| 2007/0199729 A1 | 8/2007 | Siegel et al. | |
| 2007/0205389 A1 | 9/2007 | Kurozumi et al. | |
| 2007/0253145 A1 | 11/2007 | Kurozumi et al. | |
| 2008/0016681 A1 | 1/2008 | Eisenring | |
| 2008/0026929 A1 | 1/2008 | Jensen et al. | |
| 2008/0031796 A1 | 2/2008 | Weir et al. | |
| 2008/0044344 A1 | 2/2008 | Shikida et al. | |
| 2008/0090006 A1 | 4/2008 | Yoshinaka et al. | |
| 2008/0145292 A1 | 6/2008 | Shirakawa et al. | |
| 2008/0241042 A1 | 10/2008 | Li et al. | |
| 2008/0280161 A1 | 11/2008 | Jang et al. | |
| 2008/0318144 A1 | 12/2008 | Watanabe et al. | |
| 2009/0001317 A1 | 1/2009 | Okamoto | |
| 2009/0001353 A1 | 1/2009 | Shukla et al. | |
| 2009/0002802 A1 | 1/2009 | Shibuya et al. | |
| 2009/0050850 A1 | 2/2009 | Fukui et al. | |
| 2009/0326729 A1 | 12/2009 | Hakim et al. | |

FOREIGN PATENT DOCUMENTS

| | | | |
|---|---|---|---|
| EP | 0206575 B1 | | 2/1993 |
| EP | 1020487 A1 | | 7/2000 |
| EP | 1148030 A1 | | 10/2001 |
| EP | 1296339 A1 | | 10/2001 |
| EP | 1500721 A1 | | 1/2005 |
| EP | 1598326 A1 | | 11/2005 |
| EP | 1626065 A1 | | 2/2006 |
| EP | 1724015 A1 | | 11/2006 |
| EP | 1788040 A1 | | 5/2007 |
| EP | 1860068 A1 | | 11/2007 |
| JP | 55154321 | | 12/1980 |
| JP | 63248719 | | 10/1988 |
| JP | 01179721 | | 7/1989 |
| JP | 03068102 A | * | 3/1991 |
| JP | 403068102 A | | 3/1991 |
| JP | 05017150 A | | 1/1993 |
| JP | 07291607 A | | 11/1995 |
| JP | 10092685 A | * | 4/1998 |
| JP | 11147716 A | | 6/1999 |
| JP | 2001110665 A | * | 4/2001 |
| JP | 2003192343 | | 7/2003 |
| WO | 9108469 A2 | | 6/1991 |
| WO | WO 93/16012 | | 8/1993 |
| WO | 2004092070 A1 | | 10/2004 |
| WO | 2005097704 A1 | | 10/2005 |

| | | | |
|---|---|---|---|
| WO | 2005097705 A1 | 10/2005 | |
| WO | 2006022447 A1 | 3/2006 | |
| WO | 2006124670 A2 | 11/2006 | |
| WO | 2007103421 A2 | 9/2007 | |
| WO | 2008153585 A1 | 12/2008 | |
| WO | 2008155970 A1 | 12/2008 | |

OTHER PUBLICATIONS

MSDS: Material Safety Data Sheet, "Ammonium Oxalate", 11 pages.

Non-Final Office Action dated Dec. 8, 2008 from U.S. Appl. No. 11/497,744, filed Aug. 2, 2006, Inventor(s): Richard D. Weir, et al.

Final Office Action dated Apr. 1, 2009 from U.S. Appl. No. 11/497,744, filed Aug. 2, 2006, Inventor(s): Richard D. Weir, et al.

Non-Final Office Action dated Jun. 15, 2009 from U.S. Appl. No. 11/497,744, filed Aug. 2, 2006, Inventor(s): Richard D. Weir, et al.

Final Office Action dated Dec. 1, 2009 from U.S. Appl. No. 11/497,744, filed Aug. 2, 2006, Inventor(s): Richard D. Weir, et al.

Final Office Action dated May 4, 2010 from U.S. Appl. No. 11/497,744, filed Aug. 2, 2006, Inventor(s): Richard D. Weir, et al.

J. Kuwata et al., "Electrical Properties of Perovskite-Type Oxide Thin-Films Prepared by RF Sputtering", Jpn J. Appl. Phys., Part 1, 1985, 413-15.

Bruno et al, "High-Performance Multilayer Capacitor Dielectrics from Chemically Prepared Powders," Journal of the American Ceramic Society, vol. 76, No. 5, pp. 1233-1241, 1993.

F. Sears et al., "Capacitance—Properties of Dielectrics", University of Physics, Addison Wesley Publishing Company, Inc., Feb. 1984, pp. 516-533.

Mitsubishi Polyester Film Corporation specification sheet for Hostaphan (R) RE film for capacitors, Copyright 2007.

U.S. Appl. No. 11/499,594.

U.S. Appl. No. 10/917,144.

U.S. Appl. No. 11/453,581.

U.S. Appl. No. 11/497,744.

Beheir et al., "Studies on the liquid-liquid extraction and ion and precipitate flotation of Co(II) with decanoic acid," Journal of Radioanalytical and Nuclear Chemistry, Articles, vol. 174, No. 1 (1992) 13-22.

US 7,041,269, 05/2006, Shirakawa et al. (withdrawn)

* cited by examiner

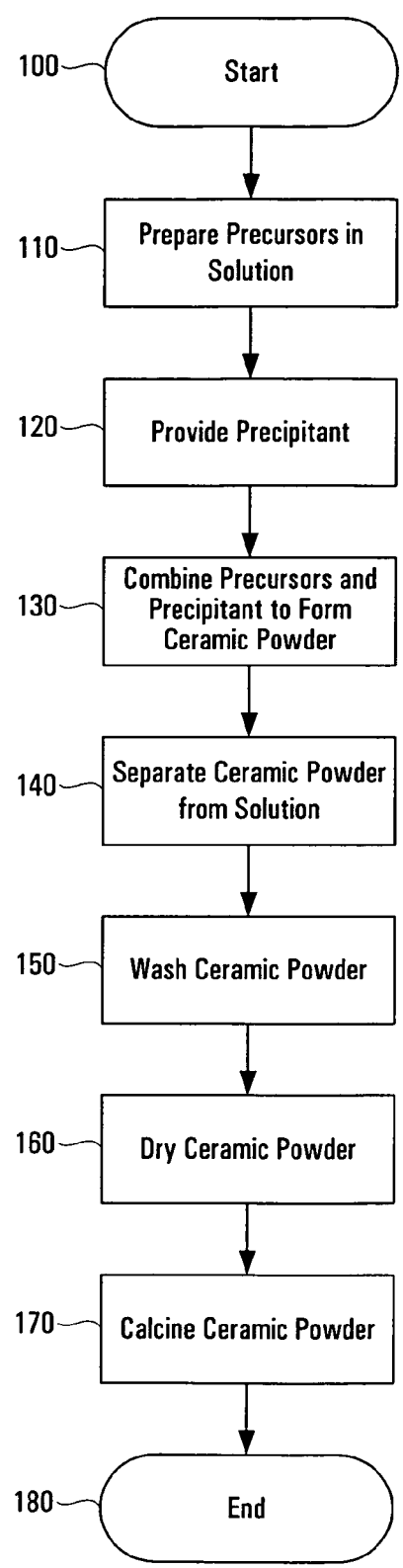
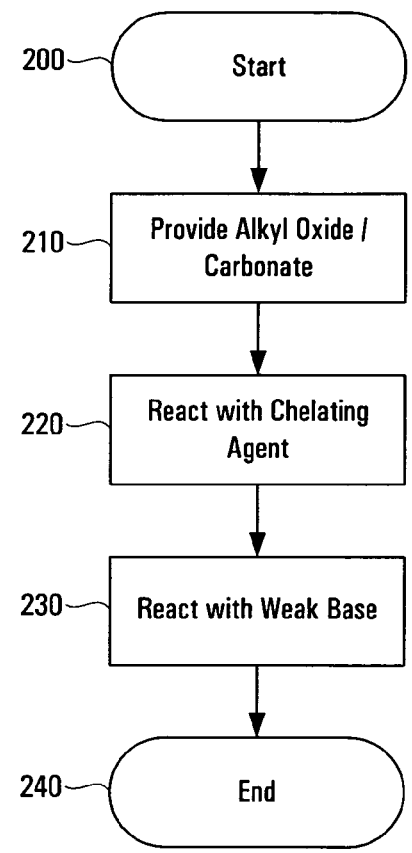
FIG. 1
FIG. 2

METHOD OF PREPARING CERAMIC POWDERS USING CHELATE PRECURSORS

This application is a continuation-in-part of U.S. patent application Ser. No. 09/833,609, entitled "Electrical-Energy-Storage Unit (EESU) Utilizing Ceramic and Integrated-Circuit Technologies for Replacement of Electrochemical Batteries," filed Apr. 12, 2001, now U.S. Pat. No. 7,033,406 and naming Richard D. Weir and Carl W. Nelson as inventors. The above-referenced application is hereby incorporated by reference herein in its entirety.

FIELD OF THE INVENTION

The present invention relates to methods for preparing ceramic powders, and particularly to wet-chemical processes using chelate precursors.

BACKGROUND OF THE INVENTION

Ceramic powders are used in the fabrication of numerous different types of devices including specialized mechanical components, coating for mechanical components, semiconductor devices, superconducting devices, device packaging, passive electronic components such as capacitors, and more sophisticated energy storage devices. Numerous different techniques exist for the synthesis and fabrication of ceramic powders including solid phase synthesis such as solid-solid diffusion, liquid phase synthesis such as precipitation and coprecipitation, and synthesis using gas phase reactants. Moreover, a host of related fabrication techniques can also be used including: spray drying, spray roasting, metal organic decomposition, freeze drying, sol-gel synthesis, melt solidification, and the like.

Various advantages of wet-chemical methods used in the preparation of powders for the fabrication of ceramics have been well-known since the early 1950s. Pioneering work in this area has been done at the Massachusetts Institute of Technology, the National Bureau of Standards (now the National Institute of Standards and Technology), Philips Research Laboratories, and Motorola, Inc.

Despite the advantages of wet chemical processes, the ceramics industry largely remains reluctant to employ these techniques. Conventional methods for preparing ceramic powders entail mechanical mixing of dry powders of water-insoluble carbonates, oxides, and sometimes silicates, where each constituent of the ceramic composition is carefully selected individually. For example, if the ceramic composition has nine constituents in solid solution, then correspondingly nine starting powders are selected in accordance with the amount of each required for the end product compound. The starting powders are very likely to have different median particle sizes and different particle size distributions. In an attempt to comminute the mixture of powders to a smaller, more uniform particle size and size distribution for each component, the powder mixture is placed in a ball mill and milled for several hours. The milling process generates wear debris from the ball mill itself and, the debris becomes incorporated in the powder mixture. Because of the often wide disparity in particle size among the various commercially available starting powders (and even significant variation in particle size of the same powder from lot to lot), an optimum result from ball milling rarely occurs, and a contamination-free product is never obtained.

Moreover, additional processing steps are still required. Solid-solid diffusion at high temperature (but below the temperature at which sintering starts) of the ball-milled powder mixture is required to form a usable and, preferably, fully reacted homogeneous single powder. The finer each powder in the mixture is, the higher the particle surface-to-volume ratio is for each. This means that there is a greater surface area per unit weight of each powder for the solid-solid diffusion to occur. Moreover, longer times spent at high temperature (e.g., the calcining temperature) produce a more satisfactory end product. Homogeneity is improved by repeating several times the ball-milling and calcining steps in succession, each requiring several hours. Of course, this increases the amount of ball-milling wear debris added to the powder, thereby increasing the amount of contamination in the end ceramic product.

Accordingly, it is desirable to have improved wet-chemical processing techniques to prepare ceramic powders for use in the fabrication of various different devices and materials.

SUMMARY OF THE INVENTION

It has been discovered that wet-chemical methods involving the use of water-soluble hydrolytically stable metal-ion chelate precursors and the use of a nonmetal-ion-containing strong base can be used in a coprecipitation procedure for the preparation of ceramic powders. Examples of the precipitants used include tetraalkylammonium hydroxides. A composition-modified barium titanate is one of the ceramic powders that can be produced. Certain metal-ion chelates can be prepared from 2-hydroxypropanoic acid and ammonium hydroxide.

In one embodiment in accordance with the invention a method is disclosed. A plurality of precursor materials are provided in solution. Each of the plurality of precursor materials in solution further comprises at least one constituent ionic species of a ceramic powder. At least one of the plurality of precursor materials in solution is a chelate solution. The plurality of precursor materials are combined in solution with a precipitant solution to cause coprecipitation of the ceramic powder in a combined solution. The ceramic powder is separated from the combined solution.

In another embodiment in accordance with the invention, a substantially contaminant free ceramic powder produced by a process is disclosed. The process includes: providing a plurality of precursor materials in solution, combining the plurality of precursor materials in solution with a nonmetal-ion-containing strong base precipitant solution to cause coprecipitation of the ceramic powder in a combined solution; and separating the ceramic powder from the combined solution. Each of the plurality of precursor materials in solution further comprises at least one constituent ionic species of the ceramic powder. At least one of the plurality of precursor materials in solution is a chelate solution.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

FIG. 1 is a flow chart illustrating ceramic powder processing techniques in accordance with the present invention.

FIG. 2 is a flow chart illustrating chelate processing techniques in accordance with the present invention.

DETAILED DESCRIPTION

The following sets forth a detailed description of at least the best contemplated mode for carrying out the one or more devices and/or processes described herein. The description is intended to be illustrative and should not be taken to be limiting.

The processes and techniques described in the present application can be utilized to prepare numerous different types of ceramic powders, as will be understood to those skilled in the art. Thus, although the present application emphasizes the use of these processes and techniques in the fabrication of dielectric materials for use in electrical energy storage devices (e.g., doped or composition-modified barium titanate), the same or similar techniques and processes can be used to prepare other ceramic powders, and those ceramic powders may find application in the manufacture of various components, devices, materials, etc.

As noted in the aforementioned '609 patent application, high-permittivity calcined composition-modified barium titanate powders can be used to fabricate high quality dielectric devices. U.S. Pat. No. 6,078,494 (hereby incorporated by reference herein in its entirety) describes examples of various doped barium titanate dielectric ceramic compositions. More specifically, the '494 patent describes a dielectric ceramic composition comprising a doped barium-calcium-zirconium-titanate of the composition $(Ba_{1-\alpha-\mu-\nu}A_\mu D_\nu Ca_\alpha)[Ti_{1-x-\delta-\mu'-\nu'}Mn_\delta A'_{\mu'}D'_{\nu'}Zr_x]_z O_3$, where A=Ag, A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 \leq \delta \leq 0.01$, and $0.995 \leq z \leq 0 \leq \alpha \leq 0.005$. These barium-calcium-zirconium-titanate compounds have a perovskite structure of the general composition $ABO_3$, where the rare earth metal ions Nd, Pr, Sm and Gd (having a large ion radius) are arranged at A-sites, and the rare earth metal ions Dy, Er, Ho, Y, Yb and Ga (having a small ion radius) are arranged at B-sites. The perovskite material includes the acceptor ions Ag, Dy, Er, Ho, Y or Yb and the donor ions Nb, Mo, Nd, Pr, Sm and Gd at lattice sites having a different local symmetry. Donors and acceptors form donor-acceptor complexes within the lattice structure of the barium-calcium-zirconium-titanate according to the invention. The dielectric ceramic compositions described by the '494 patent are just some of the many types of ceramic compositions that can be fabricated using the processes and techniques of the present application.

In the present application, chelates are used as precursors to one or more of the constituent components of a target ceramic powder. In general, chelation is the formation or presence of bonds (or other attractive interactions) between two or more separate binding sites within the same ligand and a single central atom. A molecular entity in which there is chelation (and the corresponding chemical species) is called a chelate. The terms bidentate (or didentate), tridentate, tetradentate . . . multidentate are often used to indicate the number of potential binding sites of the ligand, at least two of which are used by the ligand in forming a chelate.

For example, various wet-chemical powder preparation techniques for composition-modified barium titanate are described below. The methods make use of aqueous solutions for some or all reactants to form by coprecipitation the desired powders. Furthermore, the approach extends the use of one or more chelates (preferably water-soluble or water stable) as precursors to several of the component metal ions comprising the constituents of the composition-modified barium titanate. A nonmetal-ion-containing strong base, e.g., selected from among tetraalkylammonium hydroxides, such as tetramethylammonium hydroxide $[(CH_3)_4NOH]$ in aqueous solution is used as the precipitant for the mixture of precursors in aqueous solution. The tetraalkylammonium hydroxides, unlike conventional strong bases, e.g., sodium and potassium hydroxides, do not introduce contamination metal ions, e.g., sodium and potassium ions, to the end product. Note that there are numerous organic compounds that are basic in pH, but the tetraalkylammonium hydroxides as a group are the only organic compounds that are strong bases, e.g., as strong as common ones: NaOH and KOH, which are inorganic compound bases.

In wet-chemical methods for the preparation of ceramic powders by coprecipitation of a mixture of precursors from solution, small amounts of precipitant will typically be included within the micropores and nanopores of the product powder. Similarly, small amounts of precipitant will also be adsorbed onto the surface of product powder. Where strong bases such as sodium hydroxide or potassium hydroxide are used as the precipitant, a very large amount of DI water is consumed (typically in several successive washings of the precipitated powder) in the attempt to rid the product of the residual precipitant. This procedure is rarely completely successful, and thus some residual precipitant remains. Subsequent calcining in air of the powder product converts the residual sodium or potassium hydroxide (which upon exposure to ambient air is first converted to the carbonate by reaction with carbon dioxide in the ambient air) to the oxide, which by solid-solid diffusion becomes incorporated within the product as a constituent. For many applications, this additional constituent is an undesirable contaminant.

This unwanted result can be circumvented by the use of any of the tetraalkylammonium hydroxides as the strong base. In the examples below, tetramethylammonium hydroxide is selected for the precipitant, but various other tetraalkylammonium hydroxides can be used. In principle, no washing of the precipitated powder is needed to remove residual precipitant. However, in some embodiments, a DI water washing step, or some other washing step, is performed. Thus, a solid-solid solution of water-soluble hydrated and chelated metal-ion species in their proportioned amounts is precipitated as an oxide (the composition-modified barium titanate) by the nonmetal-ion-containing tetramethylammonium hydroxide.

During calcination in air of the product powder, the residuals: tetramethylammonium hydroxide, tetramethylammonium nitrate, tetramethylammonium 2-hydroxypropanate, ammonium hydroxide, ammonium nitrate, and ammonium 2-hydroxypropanate, are thermally decomposed and oxidized and thereby completely converted to gaseous products: $H_2O$, $NH_3$, CO, $CO_2$, $N_2$, $O_2$, $N_2O$, NO, and $NO_2$. Another advantage of the use of a tetraalkylammonium hydroxide as the precipitant is the amount of DI water required for washing is reduced or, in principle, no DI water washing step is needed since the residuals are completely converted to gaseous products.

Preparation of the high-permittivity calcined composition-modified barium titanate powder in this manner yields high purity powders with narrow particle-size distribution. The microstructures of ceramics formed from these calcined wet-chemical-prepared powders are uniform in grain size and can also result in smaller grain size. Electrical properties are improved so that higher relative permittivities and increased dielectric breakdown strengths can be obtained. Further improvement can be obtained by the elimination of voids within the sintered ceramic body with subsequent hot isostatic pressing.

In one embodiment, at least one, but not necessarily all of the precursors are chelates. A solution of the precursors: $Ba(NO_3)_2$, $Ca(NO_3)_2 \cdot 4H_2O$, $Nd(NO_3)_3 \cdot 6H_2O$, $Y(NO_3)_3 \cdot 4H_2O$, $Mn(CH_3COO)_2 \cdot 4H_2O$, $ZrO(NO_3)_2$, and $[CH_3CH(O—)COONH_4]_2Ti(OH)_2$, is formed in deionized water. In this example the Ti chelate $[CH_3CH(O—)COONH_4]_2Ti(OH)_2$ is used. As needed, the solution can be mixed and/or heated (e.g., heated to 80° C.) and is made in the proportionate amount in weight percent for each of the precursors as shown in Table 1.

TABLE 1

| Metal element | Atom fraction | At Wt | Product | Wt % |
|---|---|---|---|---|
| Ba | 0.9575 | 137.327 | 131.49060 | 98.52855 |
| Ca | 0.0400 | 40.078 | 1.60312 | 1.20125 |
| Nd | 0.0025 | 144.240 | 0.36060 | 0.27020 |
| Total | 1.0000 | | | 100.00000 |
| Ti | 0.8150 | 47.867 | 39.01161 | 69.92390 |
| Zr | 0.1800 | 91.224 | 16.42032 | 29.43157 |
| Mn | 0.0025 | 54.93085 | 0.13733 | 0.24614 |
| Y | 0.0025 | 88.90585 | 0.22226 | 0.39839 |
| Total | 1.0000 | | | 100.00000 |

A separate solution of tetramethylammonium hydroxide, possibly in excess of the amount required, is made in deionized water free of dissolved carbon dioxide ($CO_2$) and heated to 80°-85° C. Table 2 illustrates example calculations for the minimum amount of tetramethylammonium hydroxide needed.

TABLE 2

| Precursor | FW | Wt % | Wt %/FW | Mult. | Mol of base |
|---|---|---|---|---|---|
| $Ba(NO_3)_2$ | 261.34 | 48.09898 | 0.184048 | 2 | 0.368095 |
| $Ca(NO_3)_2 \cdot 4H_2O$ | 236.15 | 1.81568 | 0.007689 | 2 | 0.015377 |
| $Nd(NO_3)_3 \cdot 6H_2O$ | 438.35 | 0.21065 | 0.000481 | 3 | 0.001442 |
| $Y(NO_3)_3 \cdot 4H_2O$ | 346.98 | 0.15300 | 0.000441 | 3 | 0.001323 |
| $Mn(CH_3COO)_2 \cdot 4H_2O$ | 245.08 | 0.10806 | 0.000441 | 2 | 0.000882 |
| $ZrO(NO_3)_2$ | 231.23 | 7.34097 | 0.031747 | 2 | 0.063495 |
| $[CH_3CH(O—)COONH_4]_2Ti(OH)_2$ | 294.08 | 42.27266 | 0.143745 | 2 | 0.287491 |
| Total | | 100.00000 | | | 0.738105 |

Since the formula weight (FW) of tetramethylammonium hydroxide is 91.15, the weight of the minimum amount of tetramethylammonium hydroxide needed for 100 g of precursor mixture is (0.738105 mol)×(91.15 g/mol)=67.278 g.

The two solutions are mixed by pumping the heated ingredient streams simultaneously through a coaxial fluid jet mixer. A slurry of the coprecipitated powder is produced and collected in a drown-out vessel. The coprecipitated powder is refluxed in the drown-out vessel at 90°-95° C. for 12 hr and then filtered, optionally deionized-water washed, and dried. Alternatively, the powder can be collected by centrifugal sedimentation, or some other technique. The subsequent powder is calcined under suitable conditions, e.g., at 1050° C. in air in an appropriate silica glass (fused quartz) tray or tube.

FIG. 1 is a flow chart illustrating ceramic powder processing techniques in accordance with the present invention. The process begins at 100. In operation 110, the appropriate precursor materials, e.g., chelates and other precursors, are provided in solution (110). Next a suitable precipitant is provided (120). The two materials are then combined to form the desired ceramic powder via a coprecipitation reaction (130). Once the ceramic powder is formed, it can be separated from the solution in which it is formed (140) using suitable separation devices and techniques. Other post processing steps can be employed including: washing the ceramic powder (150), drying the ceramic powder (160), and calcining the ceramic powder (170). The process terminates at 180. The resulting ceramic powder can then be used in the fabrication of numerous different devices.

In other examples, multiple chelate precursors are used in a similar process. In the case of Zr, various Zr compounds can be used as precursors. As noted in the example above, oxozirconium(IV) nitrate(zirconyl nitrate) $[ZrO(NO_3)_2]$ can be used. However, $ZrO(NO_3)_2$ requires a relatively low pH of about 1.5, provided by an added acid solution, e.g., nitric acid ($HNO_3$), to prevent hydrolysis. An alternative approach for the precursor is the use of the hydrolytically stable chelate: zirconium(IV) bis(ammonium 2-hydroxypropanato)dihydroxide [zirconium(IV) bis(ammonium lactato)dihydroxide] $\{[CH_3CH(O—)COONH_4]_2Zr(OH)_2\}$ aqueous solution, which is stable over the pH range from 6 to 8 up to 100° C. Although this compound is not readily available commercially, it can be prepared from any of the alkyl oxides of zirconium(IV). Any of these zirconium(IV)alkyl oxides serve as an intermediate from the zirconium tetrachloride[zirconium(IV) chloride] ($ZrCl_4$) source in the preparation of all other zirconium(IV) compounds. Examples of commercially available zirconium(IV)alkyl oxides include: the ethoxide $[Zr(OCH_2CH_3)_4]$, the propoxide $[Zr(OCH_2CH_2CH_3)_4]$, the isopropoxide $\{Zr[OCH(CH_3)_2]_4\}$, the butoxide $[Zr(OCH_2CH_2CH_2CH_3)_4]$, and the tert-butoxide $\{Zr[OC(CH_3)_3]_4\}$.

Of these examples, zirconium(IV)isopropoxide(tetra-2-propyl zirconate) is likely to be the lowest cost because of the very large volume of 2-propanol (isopropyl alcohol) produced by several manufacturers. These alkyl oxides are all soluble in alcohols, but they all hydrolyze in the presence of moisture. However, by reaction with 2-hydroxypropanoic acid (2-hydroxypropionic acid, lactic acid) $[CH_3CH(OH)COOH]$, 85 wt % in aqueous solution, followed with ammonium hydroxide ($NH_4OH$), 28 wt % ammonia ($NH_3$) in water, the water-stable zirconium(IV) chelate is prepared. The other reaction product is the alcohol from which the zirconium(IV) alkyl oxide was originally made in the reaction with the zirconium tetrachloride source. This alcohol is recoverable by fractional distillation, membrane pervaporization, or the like.

The suitable water-stable titanium(IV) chelate: titanium(IV) bis(ammonium 2-hydroxypropanato)dihydroxide[titanium(IV) bis(ammonium lactato)dihydroxide] {[CH$_3$CH(O—)COONH$_4$]$_2$Ti(OH)$_2$}, is commercially available from, for example, DuPont with trade name Tyzor® LA. It can be prepared from any of the alkyl oxides of titanium(IV). Readily available commercial titanium(IV) alkyl oxides include the following: the methoxide [Ti(OCH$_3$)$_4$], the ethoxide [Ti(OCH$_2$CH$_3$)$_4$], the propoxide [Ti(OCH$_2$CH$_2$CH$_3$)$_4$], the isopropoxide {Ti[OCH(CH$_3$)$_2$]$_4$}, the butoxide [Ti(OCH$_2$CH$_2$CH$_2$CH$_3$)$_4$], and the tert-butoxide {Ti[OC(CH$_3$)$_3$]$_4$}). Of these, titanium(IV) isopropoxide(tetra-2-propyl titanate) is likely to be the least expensive. By similar preparation methods as those described above for the conversion of an alkyl oxide of zirconium(IV) to the water-stable chelate, an alkyl oxide of titanium(IV) can be converted to the water-stable titanium(IV) chelate.

Water-soluble and/or stable chelates of manganese(II), yttrium(III), lanthanum(III), neodymium(III), and several other metal ions can be prepared with the use of 2-hydroxypropanoic acid (lactic acid) and ammonium hydroxide. The most convenient starting compounds are commercially available water-insoluble carbonates of these metal ions, because they more readily react with 2-hydroxypropanoic acid aqueous solution to form the very stable water-soluble (ammonium 2-hydroxypropanato) metal-ion chelates. Water-insoluble oxides can also be used as starting compounds, although they are not as quickly reactive.

For example, a manganese chelate can be produced when the manganese(II) carbonate (MnCO$_3$) is converted to bis(ammonium 2-hydroxypropanato) manganese(II) (i.e., ammonium manganese (II) 2-hydroxypropanate) {Mn[CH$_3$CH(O—)COONH$_4$]$_2$}, as shown in the following reaction equations:

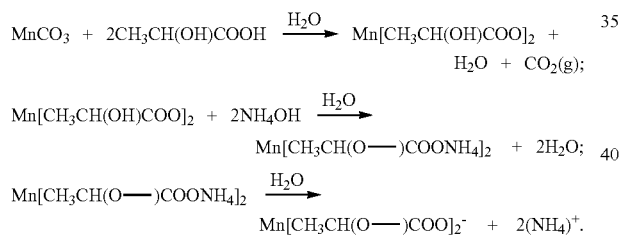

Similarly, an yttrium chelate can be produced by converting yttrium(III) carbonate [Y$_2$(CO$_3$)$_3$] to tris(ammonium 2-hydroxypropanato) yttrium(III) (i.e., ammonium yttrium (III) 2-hydroxypropanate) {Y[CH$_3$CH(O—)COONH$_4$]$_3$} as shown in the following reaction equations:

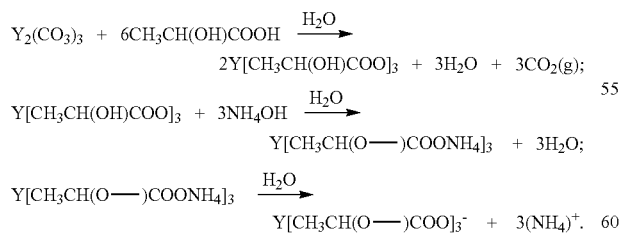

A lanthanum chelate can be produced by converting lanthanum(III) carbonate [La$_2$(CO$_3$)$_3$] to tris(ammonium 2-hydroxypropanato) lanthanum(III) (i.e., ammonium lanthanum (III) 2-hydroxypropanate) {La[CH$_3$CH(O—)COONH$_4$]$_3$} as shown in the following reaction equations:

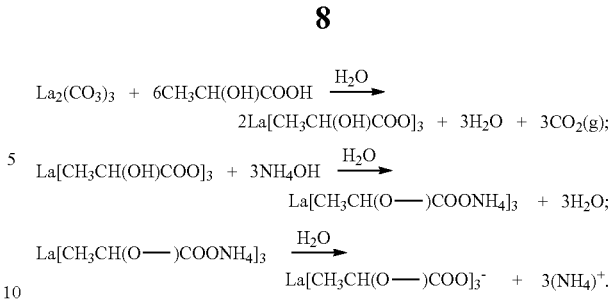

A neodymium chelate can be produced by converting neodymium(III) carbonate [Nd$_2$(CO$_3$)$_3$] to tris(ammonium 2-hydroxypropanato) neodymium(III) (i.e., ammonium neodymium(III) 2-hydroxypropanate) {Nd[CH$_3$CH(O—)COONH$_4$]$_3$} as shown in the following reaction equations:

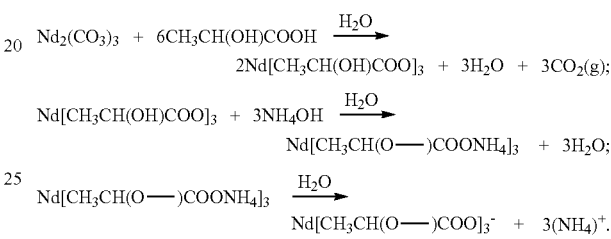

In general, nitrate compounds have the highest solubilities in water, as concentration in moles per liter of solution at 20° C., i.e., molar, and moles per 1000 grams of water at 20° C., i.e., molal, of any salt. Uniquely, there are no water-insoluble nitrates. Since the nitrate anion [(NO$_3$)$^-$] does not interfere with the formation of the chelate, the nitrates, too, can be used as starting compounds. The nitrates are readily available commercially. Accordingly the first reaction of 2-hydroxypropanoic acid with the oxo-metal-ion and metal-ion species as indicated above are as follows:

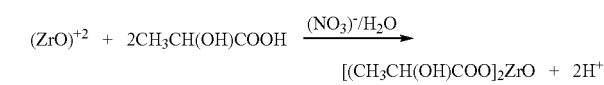

Then with ammonium hydroxide the reaction is:

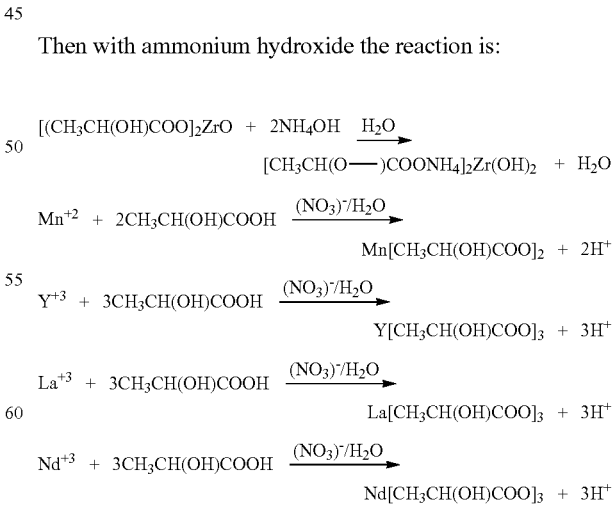

The next-step reactions with ammonium hydroxide are the same as those given above.

In the preparation of the hydrolytically stable chelates, at the first step of the reaction of either (1) the titanium(IV) and zirconium(IV) alkyl oxides, or (2) the metal-ion(II) and metal-ion(III) carbonates with the 2-hydroxypropanoic acid aqueous solution, the more acidic hydrogen ion of the carboxyl group (COOH) splits off first to form (1) the alcohol from which the alkyl oxide was made, or (2) water and carbon dioxide. With addition of the weak base ammonium hydroxide, the hydrogen atom of the hydroxyl group (OH) splits off as a hydrogen ion to form water and the ammonium ion $[(NH_4)^+]$ salt of the 2-hydroxypropanate chelate. The hydrogen atom of the hydroxyl group (OH) on the carbon atom (the 2-position or alpha-position) adjacent to the carbonyl group (C=O) is relatively acidic forming a hydrogen ion splitting off with sufficiently basic conditions provided by the addition of the ammonium hydroxide aqueous solution. Additionally, the presence of the hydroxyl group in the 2-position to the carboxylic acid group results in an increased acidity of the latter.

FIG. 2 is a flow chart illustrating chelate processing techniques in accordance with the present invention. The process begins at 200. In operation 210, the appropriate starting material, e.g., a metal alkyl oxide or a metal-ion carbonate is selected. The material is selected based on the metal ion it will ultimately provide to a resulting ceramic powder. Next, the starting material is reacted with an appropriate chelating agent (220). For example, the chelating agent can be provided in aqueous solution and combined with the starting material in a suitable reaction vessel. The combined solution is also reacted with a suitable weak base (230) to complete aspects of the reaction. The process terminates at 240.

As a chelating agent, 2-hydroxypropanoic acid is a bidentate ligand, since it can bond to a central metal cation via both oxygen atoms of the five-sided ring. Since the outer cage has two or three anion groups, the total negative charge exceeds the positive charge of the central metal cation, and the chelate is an anion with the ammonium cations $[(NH_4)^+]$ for charge balance. Ammonium ion salts have high water solubilities at neutral and near neutral pH conditions.

Use of hydrolytically stable chelates in this regard is extremely versatile, even though many of the chelate precursors are not readily available commercially. In particular, such chelates have applicability to all the metal ions of the Periodic Table except, those of Groups IA and perhaps IIA, for coprecipitation procedures in the preparation of ceramic powders. Alkaline metal ions do not form complexes and alkaline earth metal ions (Group IIA) form rather weak complexes with 2-hydroxypropanoic acid.

In general all the water-soluble 2-hydroxycarboxylic acids (alpha-hydroxycarboxylic acids) form considerably stronger complex molecular ions with most metals ions, through bidentate chelation involving both functional donor groups, than do the corresponding simple carboxylic acids. This feature makes possible in aqueous solution at neutral and near neutral pH hydrolytically stable mixtures of these chelates involving two to nearly all metal ions and oxometal ions in any mole ratio of any one to any other. Moreover, it is important to note that the ammonium compounds: nitrates, 2-hydroxproanates, etc., thermally decompose and oxidize away as gases, so that they do not have to be washed away from the product precipitate. Numerous variations on these chelate formation techniques will be known to those skilled in the art.

Table 3 illustrates an example composition modified barium titanate compound formed using the above described chelate precursors. In this example, the formula weight of the resulting compound is 237.24.

TABLE 3

| Precursor | FW | Mol Frac. | Product | Wt % |
|---|---|---|---|---|
| $Ba(NO_3)_2$ | 261.34 | 0.47875 | 125.116525 | 44.450 |
| $Ca(NO_3)_2 \cdot 4H_2O$ | 236.15 | 0.02000 | 4.723 | 1.67 |
| $Nd[CH_3CH(O\!-\!)COONH_4]_3$ | 465.57 | 0.00125 | 0.5819625 | 0.207 |
| $[CH_3CH(O\!-\!)COONH_4]_2Ti(OH)_2$ | 294.08 | 0.40750 | 119.8376 | 42.575 |
| $[CH_3CH(O\!-\!)COONH_4]_2Zr(OH)_2$ | 337.44 | 0.09000 | 30.36964375 | 10.789 |
| $Mn[CH_3CH(O\!-\!)COONH_4]_2$ | 269.15 | 0.00125 | 0.3364375 | 0.119 |
| $Y[CH_3CH(O\!-\!)COONH_4]_3$ | 410.23 | 0.00125 | 0.5127875 | 0.182 |
| | | Total | 281.4779125 | 100.00 |

In one embodiment, the two ingredient streams, one containing the aqueous solution of all the metal-ion compound precursors, and the other containing the aqueous solution of the tetramethylammonium hydroxide strong base, are reacted together simultaneously and continuously in a fluid jet column that provides a high turbulence energy environment. The total volume for the saturated or near-saturated commercially available and specially manufactured aqueous solutions of the precursors is typically four times that of the 25 wt % tetramethylammonium hydroxide aqueous solution. There are two options in this case for the jet fluid column: (1) adjust the former to a flow rate four times that of the latter, keeping the stream velocities equal by having the applied driving pressure to the two streams the same, but with the cross-sectional area of the nozzle of the former four times that of the latter; and (2) dilute one volume of the latter by three volumes of DI water, thereby lowering the concentration from 25 wt % to 6.25 wt % With equal volumes for both streams, the nozzles are alike, the flow rates are equal, and the applied driving pressure is the same. The amount of liquid processed is 60 percent greater than that of the first option, however. The first has the substantial advantage of minimizing the amount of liquid handling and the usage of DI water. There is no technical advantage in product quality of one over the other. Examples of such fluid jet column mixing techniques are described in U.S. Pat. No. 5,087,437 (hereby incorporated by reference herein in its entirety).

In other embodiments, other techniques and devices can be used to combine the ingredient streams such as, for example: (1) pouring one solution in one vessel into the other solution in another vessel and using mechanical or ultrasonic mixing, and (2) metering the solution in one vessel at some given flow rate into the other solution in another vessel and using mechanical or ultrasonic mixing. Numerous other mixing techniques will be known to those skilled in the art.

The resulting slurry can be refluxed as appropriate. Next, the slurry is transferred to a filtration or separation device. The separating of the precipitate from the liquid phase and the isolation of precipitate can be carried out using a variety of devices and techniques including: conventional filtering, vacuum filtering, centrifugal separation, sedimentation, spray drying, freeze drying, or the like. The filtered powder can then undergo various washing, drying, and calcining steps as desired.

The advantages of wet-chemical methods in the preparation of powders for fabricating oxide ceramics of technical significance are enlarged in scope with the use, as precursors, of hydrolytically stable chelates of metal ions or oxometal ions at neutral and near-neutral pH, and with the use, as the strong-base precipitating agent such as a tetraalkylammonium hydroxide aqueous solution. A preferred chelating agent is the very water-soluble 2-hydroxypropanoic acid (i.e., lactic acid) followed by neutralization with the weak-base ammonium hydroxide aqueous solution, both of which are produced in high volume and are thus relatively low in cost.

In the examples illustrated above, various compounds, solutions, temperature ranges, pH ranges, quantities, weights, and the like are provided for illustration purposes. Those having skill in the art will recognize that some or all of those parameters can be adjusted as desired or necessary. For example, other acids can be used in place of 2-hydroxypropanoic acid as a chelating agent. Alpha-hydroxycarboxylic acids having at least the same five-sided ring including the carbonyl group and having the two oxygen atoms of the ring bonding to the central metal ion or oxometal ion can be used and include:

2-hydroxyethanoic acid (i.e., glycolic acid, hydroxyacetic acid) [(OH)CH$_2$COOH];
2-hydroxybutanedioic acid (i.e., malic acid, hydroxysuccinic acid) [HOOCCH$_2$CH(OH)COOH];
2,3-dhydroxybutanedioic acid (i.e., tartaric acid) [HOOCCH(OH)CH(OH)COOH];
2-hydroxy-1,2,3-propanetricarboxylic acid (i.e., citric acid) [(OH)C(COOH)(CH$_2$COOH)$_2$];
2-hydroxybutanoic acid [CH$_3$CH$_2$CH(OH)COOH];
2-hydroxypentanoic acid [CH$_3$(CH$_2$)$_2$CH(OH)COOH]; and
2-hydroxyhexanoic acid (i.e., 2-hydroxycaproic acid) [CH$_3$(CH$_2$)$_3$CH(OH)COOH].

These water-soluble chelating agents are also useful in preparing the water-soluble precursors for the coprecipitation procedure, but they are more costly than lactic acid. Other water-soluble alpha-hydroxycarboxylic acids can be used as will be known to those skilled in the art.

Although the present invention has been described with respect to specific embodiments thereof, various changes and modifications may be suggested to one skilled in the art and it is intended that the present invention encompass such changes and modifications as fall within the scope of the appended claims.

What is claimed is:

1. A method of forming a composition-modified barium titanate ceramic powder, with a formula of $(Ba_{1-\alpha-\mu-\nu}A_\mu D_\nu Ca_\alpha)[Ti_{1-x-\delta-\mu'-\nu'}Mn_\delta A'_{\mu'}D'_{\nu'}Zr_x]_zO_3$, where A=Ag or La, A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 \leq \delta \leq 0.01$, $0.995 \leq z \leq 1$, and $0 \leq \alpha \leq 0.005$ the method comprising:

individually forming each of a plurality of water-stable constituent ion chelates, wherein each of the water-stable constituent ion chelates is formed from a constituent ionic species of the ceramic powder, ammonium hydroxide, and a chelate agent, a plurality of water-stable constituent ion chelates including ionic species zirconium, manganese, yttrium, lanthanum, and neodymium, the chelate agent comprising 2-hydroxypropanoic acid or an alpha-hydroxycarboxylic acid selected from the group consisting of 2-hydroxyethanoic acid, 2-hydroxybutanedioic acid, 2,3-dihydroxybutanedioic acid, 2-hydroxy-1,2,3-propanetricarboxylic acid, 2-hydroxybutanoic acid, 2-hydroxypentanoic acid, and 2-hydroxyhexanoic acid;

providing a plurality of precursor materials in an aqueous solution, a first precursor material of the plurality of precursor materials comprising Ba(NO$_3$)$_2$ and calcium nitrate, a second precursor comprising a stable titanium alpha-carboxylic acid chelate, a third precursor material of the plurality of precursor materials comprising the plurality of water-stable constituent ion chelates;

combining the plurality of precursor materials in the aqueous solution with a precipitant solution to cause coprecipitation of primary particles of the ceramic powder in a combined solution, the precipitant solution comprising tetraalkylammonium hydroxide, the primary particles comprising the first, second, and third precursors;

refluxing the coprecipitated primary particles of the ceramic powder;

separating the ceramic powder from the combined solution; and calcining the ceramic powder, the primary particles of the ceramic powder comprising composition-modified barium titanate having a perovskite structure.

2. The method of claim 1 wherein the constituent ionic species of the plurality of water-stable constituent ion chelates further include an ionic specie selected from the group consisting of Pr, Sm, Gd, Dy, Er, Ho, Yb, Ga, Ag, Dy, Er, Ho, Nb, and Mo.

3. The method of claim 1 wherein the plurality of water-stable constituent ion chelates include zirconium(IV) bis(ammonium 2-hydroxypropanato)dihydroxide; bis(ammonium 2-hydroxypropanato) manganese(II); tris(ammonium 2-hydroxypropanato) yttrium(III); tris(ammonium 2-hydroxypropanato)-lanthanum(III); and tris(ammonium 2-hydroxypropanato) neodymium(III).

4. The method of claim 1 wherein the tetraalkylammonium hydroxide is tetramethylammonium hydroxide.

5. The method of claim 1 wherein the combining further comprises: mixing the plurality of precursor materials in the aqueous solution and the precipitant solution in a fluid jet column.

6. The method of claim 5 further comprising: introducing the plurality of precursor materials in solution in a first stream; and introducing the precipitant solution in a second stream.

7. The method of claim 1 wherein the combining further comprises at least one of: mechanically mixing the plurality of precursor materials in solution and the precipitant solution; and ultrasonically mixing the plurality of precursor materials in solution and the precipitant solution.

8. The method of claim 1 wherein the separating the ceramic powder from the combined solution further comprises at least one of: filtering the ceramic powder from the combined solution; centrifuging the combined solution; sedimenting the combined solution; spray drying the combined solution; and freeze drying the combined solution.

9. The method of claim 1 further comprising at least one of: washing the separated ceramic powder; drying the separated ceramic powder; and sintering the separated ceramic powder.

10. The method of claim 1 wherein at least one constituent ionic species is derived from a metal alkyl oxide.

11. The method of claim 1 wherein at least one constituent ionic species is derived from a metal ion carbonate.

12. The method of claim 1 wherein the composition-modified barium titanate is doped barium-calcium-zirconium-titanate.

13. A method of forming a ceramic powder with a formula of $(Ba_{1-\alpha-\mu-v}A_\mu D_v Ca_\alpha)[Ti_{1-x-\delta-\mu'-v'}Mn_\delta A'_{\mu'}D'_{v'}Zr_x]_z O_3$, where A=Ag or La, A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq v \leq 0.01$, $0 \leq v' \leq 0.01$, $0 \leq \delta \leq 0.01$, $0.995 \leq z \leq 1$, and $0 \leq \alpha \leq 005$ for use in a dielectric material, the method comprising:

for each of the constituent metal species zirconium, manganese, yttrium, lanthanum, and neodymium:
  mixing a first solution with a second solution to form a third solution comprising a metal ion or oxometal ion chelate, the first solution comprising a metal ion or oxometal ion and the second solution comprising an alpha-hydroxycarboxylic acid;
  stabilizing the metal ion or oxometal ion chelate by adding ammonium hydroxide, the stabilized metal ion or oxometal ion chelate remaining in solution;
forming a fourth solution comprising the stabilized metal ion or oxometal ion chelate and comprising barium nitrate, calcium nitrate, and a stabilized titanium ion chelate, the fourth solution being an aqueous solution comprising each of the stabilized metal ion or oxometal ion chelate that together include the constituent metal species zirconium, manganese, yttrium, lanthanum, and neodymium;
precipitating primary particles of the ceramic powder by adding a fifth solution comprising tetraalkylammonium hydroxide, the primary particles comprising barium, calcium, titanium, and the constituent metal species;
refluxing the primary particles of the ceramic powder; and
calcining the primary particles, the calcined primary particles comprising composition-modified barium titanate having a perovskite structure.

14. The method of claim 13 wherein the tetraalkylammonium hydroxide comprises tetramethylammonium hydroxide.

15. The method of claim 13 further comprising separating the primary particles of the ceramic powder from solution.

16. The method of claim 13 wherein refluxing the precipitated primary particles includes refluxing at 90° C. to 95° C.

17. The method of claim 13 wherein the metal ion or oxometal ion chelate is selected from the group consisting of zirconium(IV) bis(ammonium 2-hydroxypropanato)dihydroxide; bis(ammonium 2-hydroxypropanato) manganese(II); tris(ammonium 2-hydroxypropanato) yttrium(III); tris (ammonium 2-hydroxypropanato) lanthanum(III); and tris (ammonium 2-hydroxypropanato) neodymium(III).

18. The method of claim 13 wherein the alpha-hydroxycarboxylic acid is selected from the group consisting of 2-hydroxyethanoic acid, 2-hydroxybutanedioic acid, 2,3-dihydroxybutanedioic acid, 2-hydroxy-1,2,3-propanetricarboxylic acid, 2-hydroxybutanoic acid, 2-hydroxypentanoic acid, and 2-hydroxyhexanoic acid.

19. The method of claim 13 wherein the alpha-hydroxycarboxylic acid is 2-hydroxy-1,2,3-propanetricarboxylic acid.

20. The method of claim 13 wherein the alpha-hydroxycarboxylic acid is 2-hydroxypropanoic acid.

21. The method of claim 13 wherein the composition-modified barium titanate is doped barium-calcium-zirconium-titanate.

22. A method of forming a ceramic powder with a formula of $(Ba_{1-\alpha-\mu-v}A_\mu D_v Ca_\alpha)[Ti_{1-x-\delta-\mu'-v'}Mn_\delta A'_{\mu'}D'_{v'}Zr_x]_z O_3$, where A=Ag or La, A'=A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq v \leq 0.01$, $0 \leq v' \leq 0.01$, $0 \leq \delta \leq 0.01$, $0.995 \leq z \leq 1$, and $0 \leq \alpha \leq 005$ for use in a dielectric material, the method comprising:

individually forming each of a plurality of stabilized metal ion or oxometal ion chelates, wherein each of the stabilized metal ion or oxometal ion chelates is formed from a constituent ionic species of the ceramic powder, ammonium hydroxide, and a chelate agent, a plurality of water-stable constituent ion chelates including the ionic species zirconium, manganese, yttrium, lanthanum, and neodymium, the chelate agent comprising 2-hydroxypropanoic acid or an alpha-hydroxycarboxylic acid selected from the group consisting of 2-hydroxyethanoic acid, 2-hydroxybutanedioic acid, 2,3-dihydroxybutanedioic acid, 2-hydroxy-1,2,3-propanetricarboxylic acid, 2-hydroxybutanoic acid, 2-hydroxypentanoic acid, and 2-hydroxyhexanoic acid;
forming a first solution from barium nitrate, calcium nitrate, a stabilized titanium ion chelate, and the plurality of stabilized metal ion or oxometal ion chelates;
precipitating primary particles of the ceramic powder including barium, titanium and the metal or oxometal ions of the plurality of metal ion or oxometal ion chelates by adding a second solution comprising tetraalkylammonium hydroxide;
refluxing the primary particles in solution;
separating the primary particles from solution; and
calcining the primary particles, the calcined primary particles comprising composition-modified barium titanate having a perovskite structure.

23. The method of claim 22 wherein the tetraalkylammonium hydroxide comprises tetramethylammonium hydroxide.

24. The method of claim 22 wherein refluxing the precipitated primary particles includes refluxing at 90° C. to 95° C.

25. The method of claim 22, wherein the plurality of metal ion or oxometal ion chelates include zirconium(IV) bis(ammonium 2-hydroxypropanato)dihydroxide; bis(ammonium 2-hydroxypropanato) manganese(II); tris(ammonium 2-hydroxypropanato) yttrium(III); tris(ammonium 2-hydroxypropanato) lanthanum(III); and tris(ammonium 2-hydroxypropanato) neodymium(III).

26. The method of claim 22 wherein the composition-modified barium titanate is doped barium-calcium-zirconium-titanate.

27. A method of forming a ceramic powder with a formula of $(Ba_{1-\alpha-\mu-v}A_\mu D_v Ca_\alpha)[Ti_{1-x-\delta-\mu'-v'}Mn_\delta A'_{\mu'}D'_{v'}Zr_x]_z O_3$, where A=Ag or La, A'=A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq v \leq 0.01$, $0 \leq v' \leq 0.01$, $0 \leq \delta \leq 0.01$, $0.995 \leq z \leq 1$, and $0 \leq \alpha \leq 005$ for use in a dielectric material, the method comprising:

forming a first solution from barium nitrate, calcium nitrate, a stabilized titanium ion chelate, and a plurality of stabilized metal ion or oxometal ion chelates, each of the stabilized metal ion or oxometal ion chelates is formed from a constituent ionic species of the ceramic powder, a hydroxide, and a chelate agent, a plurality of water-stable constituent ion chelates including the ionic species zirconium, manganese, yttrium, lanthanum, and neodymium, the chelate agent comprising 2-hydroxypropanoic acid or an alpha-hydroxycarboxylic acid selected from the group consisting of 2-hydroxyethanoic acid, 2-hydroxybutanedioic acid, 2,3-dihydroxybutanedioic acid, 2-hydroxy-1,2,3-propanetricarboxylic acid, 2-hydroxybutanoic acid, 2-hydroxypentanoic acid, and 2-hydroxyhexanoic acid;

precipitating primary particles of the ceramic powder, the particles including barium, titanium and the metal or oxometal ions of the plurality of metal ion or oxometal ion chelates by adding a second solution comprising tetraalkylammonium hydroxide;

refluxing the primary particles in solution;

separating the primary particles from solution; and calcining the primary particles, the calcined primary particles being composition-modified barium titanate having a perovskite structure.

28. The method of claim 27 wherein the composition-modified barium titanate is doped barium-calcium-zirconium-titanate.

* * * * *

UNITED STATES PATENT AND TRADEMARK OFFICE
CERTIFICATE OF CORRECTION

PATENT NO.        : 7,914,755 B2                                     Page 1 of 1
APPLICATION NO.   : 11/369255
DATED             : March 29, 2011
INVENTOR(S)       : Richard D. Weir et al.

It is certified that error appears in the above-identified patent and that said Letters Patent is hereby corrected as shown below:

Column 13, line 6, please delete "005" and insert therefor --0.005--.

Column 14, line 2, please delete "005" and insert therefor --0.005--.

Column 14, line 51, please delete "005" and insert therefor --0.005--.

Signed and Sealed this
Twenty-fifth Day of September, 2012

David J. Kappos
*Director of the United States Patent and Trademark Office*